US010222507B2

(12) United States Patent
Bittar et al.

(10) Patent No.: US 10,222,507 B2
(45) Date of Patent: Mar. 5, 2019

(54) DATA TRANSMISSION SYSTEMS AND METHODS FOR AZIMUTHALLY SENSITIVE TOOLS WITH MULTIPLE DEPTHS OF INVESTIGATION

(75) Inventors: Michael S. Bittar, Houston, TX (US); Clive D. Menezes, Conroe, TX (US)

(73) Assignee: Halliburton Energy Services, Inc., Houston, TX (US)

(*) Notice: Subject to any disclaimer, the term of this patent is extended or adjusted under 35 U.S.C. 154(b) by 2020 days.

(21) Appl. No.: 12/808,193

(22) PCT Filed: Nov. 19, 2008

(86) PCT No.: PCT/US2008/084006
§ 371 (c)(1),
(2), (4) Date: Jun. 15, 2010

(87) PCT Pub. No.: WO2010/059151
PCT Pub. Date: May 27, 2010

(65) Prior Publication Data
US 2010/0262370 A1   Oct. 14, 2010

(51) Int. Cl.
*G01V 1/40* (2006.01)
*G01V 11/00* (2006.01)
(52) U.S. Cl.
CPC .................. *G01V 11/002* (2013.01)
(58) Field of Classification Search
CPC ............ E21B 1/00; G01V 3/38; G01V 11/002
(Continued)

(56) References Cited

U.S. PATENT DOCUMENTS 3,431,552 A   3/1969   Weeks
3,960,448 A   6/1976   Schmidt et al.
(Continued)

FOREIGN PATENT DOCUMENTS

WO   WO08/021868     2/2008
WO   WO-2008/118735  10/2008

OTHER PUBLICATIONS

Bittar, Michael S., "Processing Resistivity Logs", U.S. Appl. No. 60/821,721, filed Aug. 8, 2006.
(Continued)

*Primary Examiner* — Hyun Park
(74) *Attorney, Agent, or Firm* — Benjamin Fite; C. Tumey Law Group PLLC

(57) ABSTRACT

Disclosed herein are various telemetry systems and methods suitable for communicating a cylindrical volume of formation property measurements to the surface. Some system embodiments include a downhole processor coupled to a telemetry transmitter. The downhole processor determines a compressed representation of the formation property measurements and/or selects a subset of the measurements for transmission uphole. The subset selection can be based on selected radial distances having characteristics that potentially indicate features of interest to a user. Such features include bed boundaries, and the characteristics include sinusoidal variation as a function of azimuth, large changes in this sinusoidal variation versus radial distance, or inversion suggesting the presence of a bed boundary. Various compressed representations of the cylindrical data volume are disclosed, including representations based on parameters of a sinusoidal model, representations based on a two dimensional transform, and representations based on estimates of distance and direction to a bed boundary.

9 Claims, 4 Drawing Sheets

(58) Field of Classification Search
USPC .......................................................... 702/6
See application file for complete search history.

(56) References Cited

U.S. PATENT DOCUMENTS

| | | | |
|---|---|---|---|
| 4,535,625 A | 8/1985 | Lyle, Jr. | |
| 4,556,884 A * | 12/1985 | Howells | G01V 11/002 340/855.3 |
| 4,567,759 A | 2/1986 | Ekstrom et al. | |
| 4,625,547 A | 12/1986 | Lyle, Jr. | |
| 4,677,596 A | 6/1987 | Lyle, Jr. et al. | |
| 4,739,325 A * | 4/1988 | MacLeod | E21B 17/003 324/342 |
| 4,781,062 A * | 11/1988 | Taylor | E21B 47/02 33/303 |
| 5,010,333 A * | 4/1991 | Gardner | E21B 47/12 340/854.1 |
| 5,185,578 A * | 2/1993 | Stolarczykz | G01V 3/30 324/335 |
| 5,389,881 A | 2/1995 | Bittar et al. | |
| 5,448,227 A | 9/1995 | Orban et al. | |
| 5,528,029 A | 6/1996 | Chapellat et al. | |
| 5,581,024 A | 12/1996 | Meyer et al. | |
| 5,671,136 A * | 9/1997 | Willhoit, Jr. | G01V 1/30 702/18 |
| 5,821,413 A | 10/1998 | Chapin | |
| 5,899,958 A * | 5/1999 | Dowell | E21B 47/0002 175/50 |
| 6,125,203 A * | 9/2000 | Keskes | G01V 3/38 382/109 |
| 6,163,155 A | 12/2000 | Bittar | |
| 6,191,586 B1 | 2/2001 | Bittar | |
| 6,206,108 B1 * | 3/2001 | MacDonald | E21B 44/00 175/24 |
| 6,218,842 B1 | 4/2001 | Bittar | |
| 6,255,819 B1 | 7/2001 | Day et al. | |
| 6,337,568 B1 | 1/2002 | Tutunji et al. | |
| 6,353,321 B1 | 3/2002 | Bittar | |
| 6,359,438 B1 | 3/2002 | Bittar | |
| 6,388,441 B1 | 5/2002 | Chen | |
| 6,405,136 B1 | 6/2002 | Li et al. | |
| 6,460,936 B1 | 10/2002 | Abramov et al. | |
| 6,476,609 B1 | 11/2002 | Bittar | |
| 6,538,447 B2 | 3/2003 | Bittar | |
| 6,665,117 B2 | 12/2003 | Neff et al. | |
| 6,670,813 B2 | 12/2003 | Strack | |
| 6,772,066 B2 | 8/2004 | Cook | |
| 6,810,331 B2 | 10/2004 | Bittar et al. | |
| 6,885,943 B2 | 4/2005 | Bittar et al. | |
| 6,904,365 B2 | 6/2005 | Bratton et al. | |
| 6,911,824 B2 | 6/2005 | Bittar | |
| 7,002,484 B2 | 2/2006 | McElhinney | |
| 7,019,528 B2 | 3/2006 | Bittar | |
| 7,027,925 B2 | 4/2006 | Terentyev et al. | |
| 7,098,664 B2 | 8/2006 | Bittar et al. | |
| 7,098,858 B2 | 8/2006 | Bittar et al. | |
| 7,133,779 B2 | 11/2006 | Tilke et al. | |
| 7,138,803 B2 | 11/2006 | Bittar | |
| 7,147,066 B2 | 12/2006 | Chen-Kang et al. | |
| 7,265,552 B2 | 9/2007 | Bittar | |
| 7,302,373 B2 | 11/2007 | Fleury et al. | |
| 7,337,067 B2 | 2/2008 | Sanstrom | |
| 7,345,487 B2 | 3/2008 | Bittar et al. | |
| 7,366,616 B2 | 4/2008 | Bennett et al. | |
| 7,427,863 B2 | 9/2008 | Bittar | |
| 7,483,152 B2 | 1/2009 | Jovancicevic et al. | |
| 7,502,026 B2 | 3/2009 | Acosta et al. | |
| 7,557,579 B2 | 7/2009 | Bittar | |
| 7,557,580 B2 | 7/2009 | Bittar | |
| 7,659,722 B2 | 2/2010 | Bittar | |
| 7,746,078 B2 | 6/2010 | Bittar et al. | |
| 7,839,346 B2 | 11/2010 | Bittar et al. | |
| 7,948,238 B2 | 5/2011 | Bittar | |
| 8,222,902 B2 | 7/2012 | Bittar et al. | |
| 8,264,228 B2 | 9/2012 | Bittar et al. | |
| 8,275,544 B1 | 9/2012 | Wells et al. | |
| 2003/0051914 A1 | 3/2003 | Bittar | |
| 2003/0065447 A1 | 4/2003 | Bramlett et al. | |
| 2003/0222651 A1 | 12/2003 | Tabanou | |
| 2004/0027131 A1 | 2/2004 | Bittar | |
| 2004/0158997 A1 | 8/2004 | Tang | |
| 2004/0204855 A1 | 10/2004 | Fleury et al. | |
| 2004/0204857 A1 * | 10/2004 | Ramamoorthy | G01V 11/00 702/7 |
| 2005/0024060 A1 | 2/2005 | Bittar | |
| 2005/0134280 A1 | 6/2005 | Bittar et al. | |
| 2005/0165555 A1 | 7/2005 | Jackson | |
| 2005/0171698 A1 | 8/2005 | Sung et al. | |
| 2005/0216197 A1 | 9/2005 | Zamora et al. | |
| 2006/0022887 A1 | 2/2006 | Bittar | |
| 2006/0190178 A1 | 8/2006 | Zamora et al. | |
| 2006/0244455 A1 | 11/2006 | Bittar | |
| 2006/0255811 A1 | 11/2006 | Bittar et al. | |
| 2006/0293872 A1 | 12/2006 | Zamora | |
| 2007/0075455 A1 | 4/2007 | Marini et al. | |
| 2007/0114062 A1 * | 5/2007 | Hall | E21B 10/62 175/50 |
| 2007/0156340 A1 * | 7/2007 | Shray | G01V 1/34 702/11 |
| 2007/0213935 A1 | 9/2007 | Fagnou et al. | |
| 2007/0235225 A1 | 10/2007 | Bittar | |
| 2007/0255545 A1 | 11/2007 | Pita et al. | |
| 2008/0078580 A1 | 4/2008 | Bittar | |
| 2008/0120035 A1 * | 5/2008 | Hassan | G01B 21/22 702/10 |
| 2008/0130407 A1 | 6/2008 | Akhtar | |
| 2008/0179094 A1 | 7/2008 | Repin et al. | |
| 2008/0315884 A1 | 12/2008 | Bittar et al. | |
| 2009/0015260 A1 | 1/2009 | Bittar | |
| 2009/0224764 A1 | 9/2009 | Bittar | |
| 2009/0302851 A1 | 12/2009 | Bittar et al. | |
| 2009/0309798 A1 | 12/2009 | Bittar et al. | |
| 2011/0175899 A1 | 7/2011 | Bittar et al. | |
| 2012/0217008 A1 | 8/2012 | Moos et al. | |

OTHER PUBLICATIONS

Bittar, Michael S., "Tool for Azimuthal Resistivity Measurement and Bed Boundary Detection", U.S. Appl. No. 60/821,988, filed Aug. 10, 2006.
Bittar, Michael S., "Resistivity Logging with Reduced Dip Artifacts", PCT Appl No. US2007/075455, filed Aug. 8, 2006.
Bittar, Michael S., et al., "A 3D Borehole Imager and a Dielectric Measurement Tool", PCT Appl No. US09/65537, filed Nov. 23, 2009.
Bittar, Michael S., et al., "Antenna Coupling Component Measurement Tool Having a Rotating Antenna Configuration", PCT Appl No. US06/062149, filed Dec. 15, 2006.
Bittar, Michael S., et al., "EM-Guided Drilling Relative to an Existing Borehole", U.S. Appl. No. 12/526,552, filed Aug. 10, 2009.
Bittar, Michael S., et al., "Look-Ahead Boundary Detection and Distance Measurement", U.S. Appl. No. 12/067,582, filed Mar. 20, 2008.
Bittar, Michael S., et al., "Method and Apparatus for Building a Tilted Antenna", U.S. Appl. No. 12/306,954, filed Dec. 30, 2008.
Bittar, Michael S., et al., "Method and Apparatus with High Resolution Electrode Configuration for Imaging in Oil-Based Muds", U.S. Appl. No. 12/680,868, filed Mar. 30, 2010.
Bittar, Michael S., et al., "Modular Geosteering Tool Assembly", U.S. Appl. No. 12/306,267, filed Dec. 23, 2008.
Bittar, Michael S., et al., "Multimodal Geosteering Systems and Methods", U.S. Appl. No. 12/679,502, filed Mar. 23, 2010.
Bittar, Michael S., et al., "Multi-Step Borehole Correction Scheme for Multi-Component Induction Tool", U.S. Appl. No. 61/319,291, filed Mar. 31, 2010.
Bittar, Michael S., et al., "Robust Inversion Systems and Methods for Azimuthally Sensitive Resistivity Logging Tools", U.S. Appl. No. 12/229,760, filed Nov. 5, 2008.
Bittar, Michael S., et al., "Systems and Methods for Displaying Logging Data", U.S. Appl. No. 12/295,158, filed Sep. 29, 2008.

(56) References Cited

OTHER PUBLICATIONS

Bittar, Michael S., et al., "Systems and Methods Having Radially Offset Antennas for Electromagnetic Resistivity Logging", U.S. Appl. No. 12/300,876, filed Nov. 14, 2008.

Int'l Preliminary Report on Patentability and Written Opinion, dated Oct. 8, 2009, PCT Appl No. US2008/057619, "Systems and Methods for Displaying Logging Data", filed Mar. 20, 2008, 9 pgs.

PCT Int'l Search Report and Written Opinion, dated Jan. 5, 2009, Appl No. PCT/US08/84006, Data Transmission Systems and Methods for Azimuthally Sensitive Tools with Multiple Depths of Investigation, 1 pg.

PCT Int'l Search Report and Written Opinion, dated Aug. 1, 2008, PCT Appl No. US08/057619, Systems and Methods for Displaying Logging Data, filed Mar. 20, 2008. 10 pgs.

US Non-Final Office Action, dated Jan. 28, 2014, U.S. Appl. No. 12/295,158, "Systems and Methods for Displaying Logging Data," filed Apr. 12, 2011, 17 pgs.

US Final Office Action, dated May 14, 2014, U.S. Appl. No. 12/295,158, "Systems and Methods for Displaying Logging Data," filed Apr. 12, 2011, 13 pgs.

\* cited by examiner

DATA TRANSMISSION SYSTEMS AND METHODS FOR AZIMUTHALLY SENSITIVE TOOLS WITH MULTIPLE DEPTHS OF INVESTIGATION

BACKGROUND

Oil field operators demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole. The direct electrical connection between the surface and the sonde provides a relatively large (but not unlimited) bandwidth for conveying logging information.

In LWD, the drilling assembly includes sensing instruments that measure various parameters as the formation is being penetrated. While LWD techniques allow more contemporaneous, and often more accurate, formation measurements, it is difficult to establish and maintain a direct electrical connection in an LWD environment. Consequently, alternative communication channels are typically employed for obtaining LWD logging information. Contemplated LWD communication channels include mud pulse signaling, through-wall acoustic signaling, and electromagnetic wave signaling. In each of these channels, the useful bandwidth is highly restricted relative to wireline logging.

As new tools and measurement techniques are developed the demand for higher information rates continues to increase beyond existing telemetry channel capacities.

BRIEF DESCRIPTION OF THE DRAWINGS

A better understanding of the disclosed invention embodiments can be obtained when the following detailed description is considered in conjunction with the attached drawings, in which.

Figure 1:
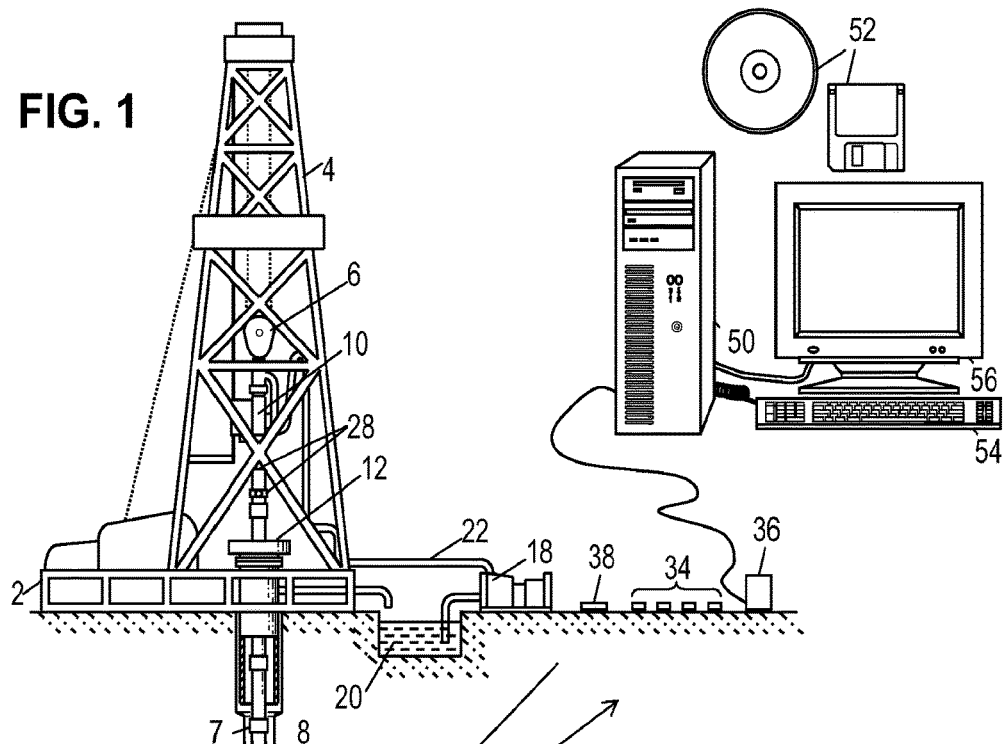
FIG. 1 shows an illustrative logging while drilling (LWD) environment having an electromagnetic telemetry system.

While the disclosed embodiments are susceptible to various modifications and alternative forms, specific examples are given for illustrative purposes in the drawings and the following description. It should be understood, however, that the drawings and detailed description are not intended to limit the invention to the particular form disclosed, but on the contrary, the intention is to cover all modifications, equivalents and alternatives falling within the spirit and scope of the appended claims.

Nomenclature

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ". The term "couple" or "couples" is intended to mean either an indirect or direct connection, whether the connection is electrical, mechanical, or thermal. Thus, if a first device couples to a second device, that coupling may be through a direct connection or through an indirect connection via other devices and connections.

DETAILED DESCRIPTION

The issues identified in the background are at least partly addressed by the use of telemetry systems and methods designed to accommodate measurements of azimuthally sensitive tools having multiple depths of investigation. The volume of formation property measurements can be best represented as a cylindrical volume. Some system embodiments include a downhole processor coupled to a telemetry transmitter. The downhole processor determines a compressed representation of the formation property measurements and/or selects a subset of the measurements for transmission uphole. The subset selection can be based on selected radial distances having characteristics that potentially indicate features of interest to a user. Such features include bed boundaries, and the characteristics include sinusoidal variation as a function of azimuth, large changes in this sinusoidal variation versus radial distance, or inversion suggesting the presence of a bed boundary. Various compressed representations of the cylindrical data volume are disclosed, including representations based on parameters of a sinusoidal model, representations based on a two dimensional transform, and representations based on estimates of distance and direction to a bed boundary.

The disclosed telemetry systems and methods are best understood in the context of the larger systems in which they operate. Accordingly, FIG. 1 shows an electromagnetic telemetry system in an illustrative logging-while-drilling ("LWD") environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where it is filtered and recirculated.

The drill bit 14 is just one piece of a bottom-hole assembly that includes one or more drill collars (thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, a downhole positioning tool 24 includes a 3-axis fluxgate magnetometer and a 3-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes logging instruments to gather measurements of formation properties. Using these measurements in combination with the above-mentioned tool orientation measurements, the driller can steer the drill bit 14 along a desired path using any one of various suitable directional drilling systems, including steering vanes, a "bent sub", and a rotary steerable system. The steering mechanism can be alternatively controlled downhole, with a downhole controller programmed to follow a chosen or dynamically-determined route.

The bottom-hole assembly still further includes a telemetry transceiver 26 to exchange information with the surface. Two telemetry techniques are illustrated here. Telemetry transceiver 26 may generate acoustic signals that propagate along the walls of the drill string to a set of surface transceivers 28, with optional repeaters 30 provided to boost the signal strength. Conversely, the surface transceivers 28 can generate acoustic signals that propagate in the opposite direction to downhole telemetry transceiver 26. Alternatively, or in addition, telemetry transceiver 26 may generate EM signals 32 that propagate through the formation to a detection array 34 where it is amplified and forwarded to a data acquisition module 36 for capture and preliminary processing. A surface transmitter 38 can generate return EM signals 40 that propagate to the downhole telemetry transceiver 26.

Of course, other suitable telemetry techniques exist and can be used to exchange information between the surface and the bottom-hole assembly. The noted techniques may be particularly noted for imposing narrow bandwidth limits on the communications signals under at least some system configurations. In any event, surface systems can send tool commands and configuration parameters to the bottom-hole assembly, and can receive measurement data (including drilling parameters, tool orientation and position, tool configuration data, and formation measurements) from the bottom-hole assembly. In at least some system embodiments, the uplink signal is provided in the form of a narrowband OFDM modulated signal.

A data acquisition module 36 receives the uplink signal from the EM detection array 34 and/or surface transceivers 28. Module 36 optionally provides some preliminary processing (e.g., beam-forming to enhance signal to noise ratio) and digitizes the signal. A data processing system 50 (shown in FIG. 1 as a desktop computer) receives a digital telemetry signal, demodulates the signal, and displays the tool data or well logs to a user. Software (represented in FIG. 1 as information storage media 52) governs the operation of system 50. A user interacts with system 50 and its software 52 via one or more input devices 54 and one or more output devices 56.

A number of LWD tools may be included in the bottom hole assembly, such as Halliburton's Azimuthal Deep Resistivity (ADR) tool, the tool disclosed in U.S. Pat. No. 6,476,609 entitled "Electromagnetic wave resistivity tool having a tilted antenna for geosteering within a desired pay zone" by Michael Bittar, or the tool disclosed in application PCT/US08/51447 entitled "EM-Guided Drilling Relative to an Existing Borehole" by Michael Bittar. The ADR tool is an induction tool that makes attenuation and phase shift for multiple depths of investigation in each of multiple azimuthal sectors. Multiple transmitter-receiver antenna spacings are employed to provide multiple depths of investigation. Though each antenna spacing corresponds to a different depth of investigation (DOI), these DOIs typically vary with formation resistivity. However, the measurements for fixed DOIs can be calculated from the measurements obtained using the various antenna spacings. Such processing is not required, but it is well within the capabilities of the downhole processor.

Figure 2:
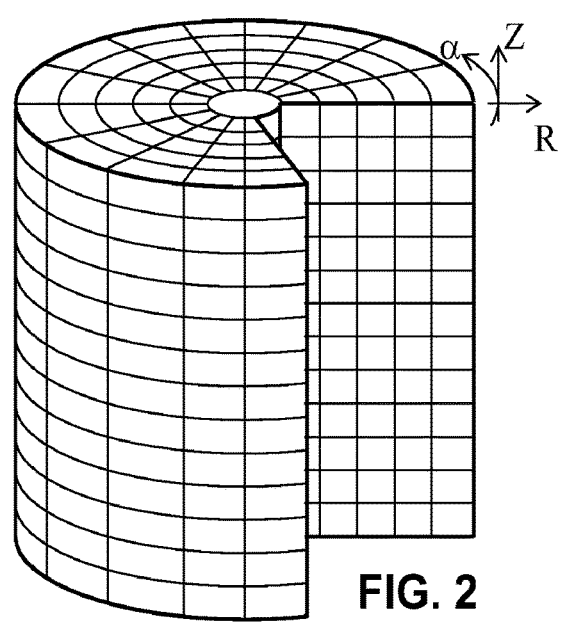
FIG. 2 shows an illustrative volumetric data array having cylindrical coordinates.

As the drill string moves along the borehole, the tool makes its measurements at each position, yielding measurements that can be represented using cylindrical coordinates as shown in FIG. 2. Displacement along the borehole axis is represented by the Z-axis, radial displacement R is usually measured perpendicular to the borehole axis, and azimuth a is usually measured angularly from the top side of the borehole (for approximately vertical boreholes, the azimuth is measured angularly from the north side of the borehole).

Though it is not illustrated in FIG. 2, the ADR tool makes attenuation and phase shift measurements of electromagnetic waves at 10 depths of investigation in each of about 32 azimuthal sectors. Without some form of compression or selectivity, the amount of data from this tool alone will quickly overwhelm most LWD telemetry schemes. Nevertheless, it is desirable to have such information available in real time at the surface for geosteering, formation characterization, and formation visualization/mapping. Accordingly, a number of transmission techniques are disclosed herein, exploiting various features of the data geometry for compression and/or selective data transmission.

Figure 3:
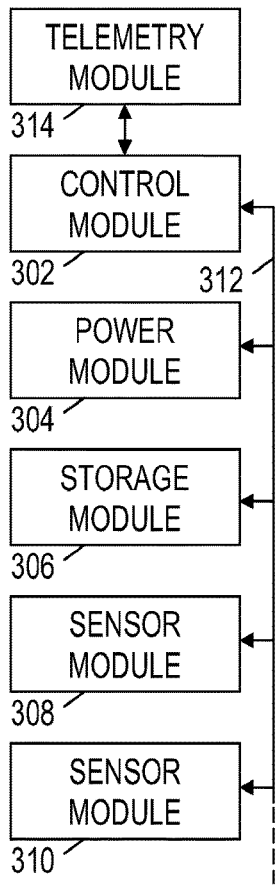
FIG. 3 is a block diagram of an illustrative downhole tool system.

FIG. 3 is a block diagram of an illustrative downhole tool system having a control module 302, a power module 304, an optional storage module 306, and one or more sensor modules 308-310. A tool bus 312 enables the control module 302 to communicate with each of the other modules 304-310 to transfer data and control their operations. A telemetry module 314 couples top the control module 302 to enable the control module to communicate with a data processing system 50 (FIG. 1) at the surface to exchange data and to receive commands for configuring the operation of the bottom hole tool assembly.

Power module 304 supplies power to the other modules. To that end, the power module 304 may include an energy storage device such as a battery, or an electrical power generator such as a turbine in the mud flow or a vibrational energy harvester. Optional storage module 306 includes memory for storing logging measurement data until it can be transmitted to the surface or until the tool is recovered and the data can be directly downloaded. Sensor modules 308-310 represent tools (such as the ADR tool) for measuring formation characteristics and tools for measuring parameters of the drilling operation including tool position and orientation.

Control module 302 configures the operation of the sensor modules and coordinates the transfer of tool measurement data from the sensor modules to the storage module. As previously mentioned, the volume of stored data can grow too quickly to allow for all the information to be telemetered to the surface. Accordingly, control module 302 sends data to the surface in accordance with a subset selection and/or compression method described herein below. Telemetry module 314 communicates data to the surface using any suitable LWD telemetry technique including mud pulse telemetry, acoustic telemetry, and electromagnetic telemetry.

Figure 4:
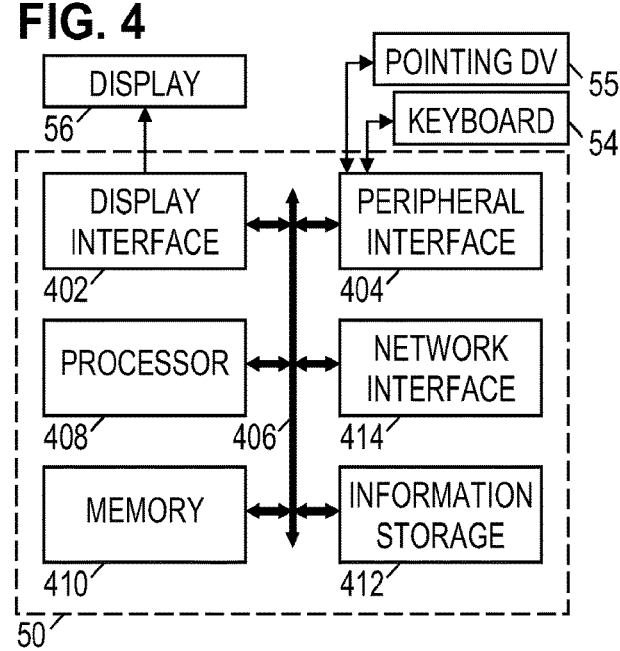
FIG. 4 is a block diagram of an illustrative surface processing system.

FIG. 4 is a block diagram of an illustrative surface processing system suitable for collecting volumetric logging data and generating visualizations thereof. In some embodiments, a user may further interact with the system to send command to the bottom hole assembly to adjust its operation in response to the received data. The system of FIG. 4 can take the form of a computer that includes a chassis 50, a display 56, and one or more input devices 54, 55. Located in the chassis 50 is a display interface 402, a peripheral interface 404, a bus 406, a processor 408, a memory 410, an information storage device 412, and a network interface 414. Bus 406 interconnects the various elements of the computer and transports their communications.

In at least some embodiments, the surface telemetry transducers are coupled to the processing system via the network interface 414 to enable the system to communicate with the bottom hole assembly. In accordance with user input receive via peripheral interface 404 and program instructions from memory 410 and/or information storage device 412, the processor processes the received telemetry information received via network interface 414 to reconstruct a volumetric logging data set and display it to the user. The processor 408, and hence the system as a whole, generally operates in accordance with one or more programs stored on an information storage medium (e.g., in information storage device 412). Similarly, the bottom hole assembly control module 302 operates in accordance with one or more programs stored in an internal memory. One or more of these programs configures the control module and processing system to carry out at least one of the telemetry methods disclosed herein.

Figure 5:
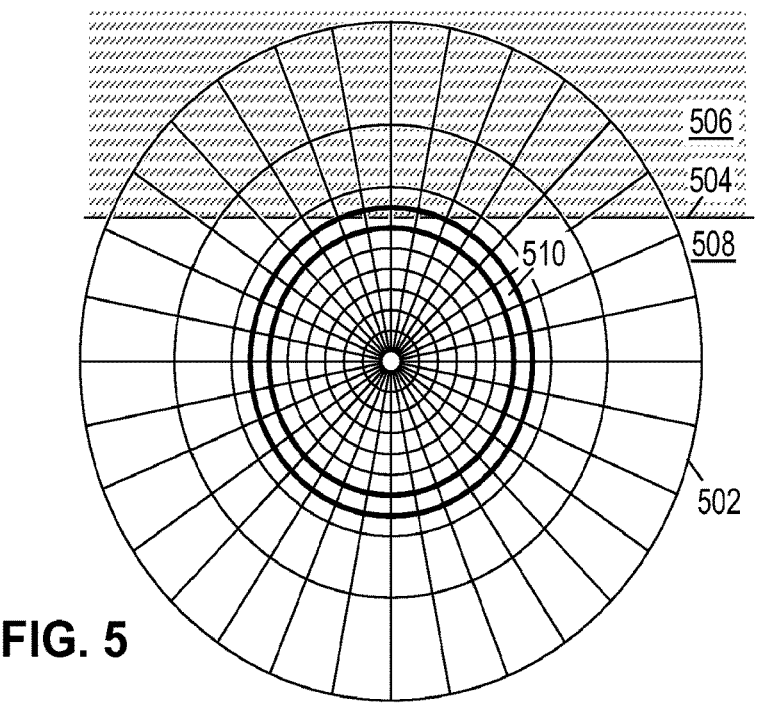
FIG. 5 shows an illustrative formation bed boundary in relation to a slice of the volumetric data array.

FIG. 5 shows a "constant Z" slice 502 of the illustrative cylindrical data volume. In the illustrated data volume, the radial distances of the rings may, for example, be R=30 cm, 60 cm, 90 cm, 120 cm, 150 cm, 180 cm, 210 cm, 240 cm, 300 cm, and 450 cm, though of course other radial distances can be used instead. Note that the dimensions of the data cells need not be uniform, and in the illustrate example the outer rings have larger radial extents.

FIG. 5 further shows an illustrative boundary 504 between two formation beds 506 and 508. The boundary is shown crossing through the outer three rings (and encroaching on the next ring 510) of the tool's measurement range. Ring 510 marks the approximate region where the tool measurements begin indicating the presence of the boundary.

Figure 6:
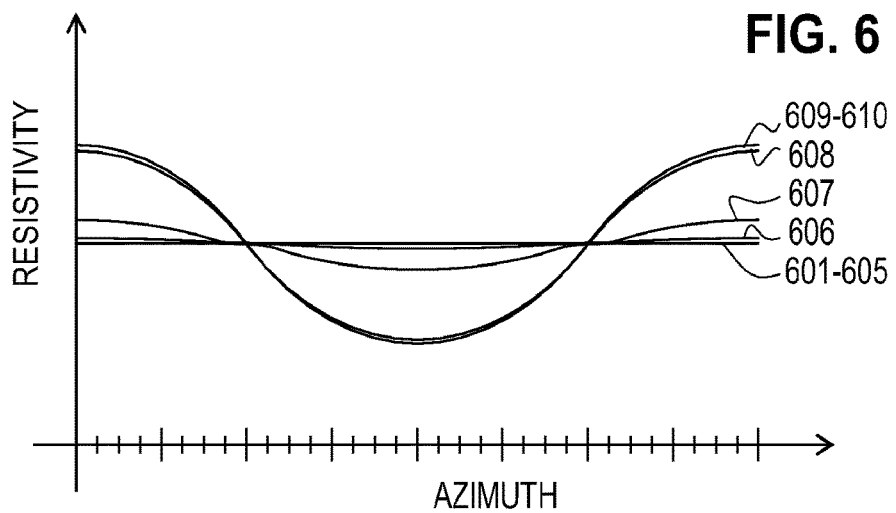
FIG. 6 shows illustrative curves of resistivity measurements versus azimuth for different radii.

FIG. 6 shows illustrative graphs of the tool's measurements of resistivity versus azimuth. The curves 601-606 indicate that within the inner rings of the tool's measurement range, the measured phase shifts and attenuation indicate a relative constant resistivity. The curve for the seventh ring 510 (curve 607) is intermediate between the curves for the inner rings and the curves for the outer rings. The radial distance of this transition ring is indicative of the distance to the bed boundary. Curves 608-610 indicate that the attenuation and phase shift measurements for the outer rings (those that are traversed by the bed boundary 504) indicate a sinusoidal variation of the resistivity. If properly computed, the magnitude of the peak-to-peak variation depends on the change in formation resistivity and the distance to the formation boundary. If it is known whether the neighboring formation has a higher or lower resistivity than the current formation, then the direction to the bed boundary is also readily ascertainable.

Figure 7:
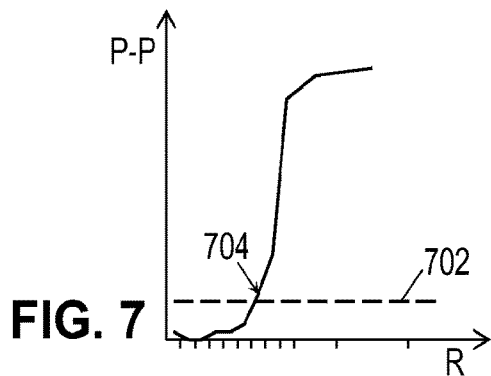
FIG. 7 shows an illustrative curve of peak-to-peak variation versus radius.

FIG. 7 shows the sinusoidal peak-to-peak magnitude of curves 601-610 as a function of radial distance. The peak-to-peak oscillation amplitude can be determined by either fitting a curve or simply calculating a maximum difference between opposite azimuthal orientations. In some embodiments, the peak-to-peak amplitude can be determined using a transform such as a discrete cosine transform. A predetermined or dynamically determined threshold value 702 may be used to determine which, if any, of the rings of data should be communicated to the surface. FIG. 7 shows that the seventh ring has the first peak-to-peak value 704 to exceed the threshold.

Figure 8:
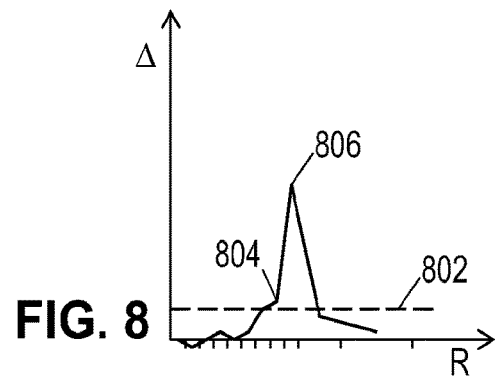
FIG. 8 shows an illustrative curve of the change in peak-to-peak variation versus radius.

FIG. 8 shows a derivative of the peak-to-peak magnitude curve of FIG. 7. In cooperation with, or in place of the magnitude test of FIG. 7, a predetermined or dynamically determined derivative threshold 802 may be used to determine which, if any, of the rings of data should be communicated to the surface. FIG. 8 shows that the seventh and eighth rings have derivative values 804, 806 that exceed the derivative threshold 802. The use of these criteria and others is described below.

Figure 9:
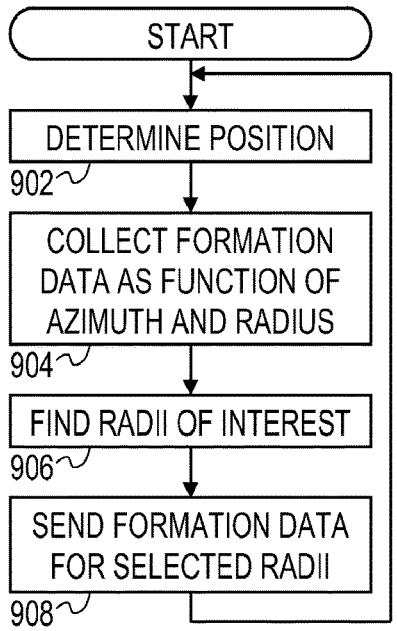
FIG. 9 is a flowchart of a first illustrative telemetry method that sends data from selected radii.

FIG. 9 is a flowchart of a first illustrative telemetry method that sends data from selected radii. In block 902, the control module determines the current tool position and/or orientation. (In some embodiments, the control module tracks only time information, which can be later mapped to a tool position using position data collected at the surface.) In block 904, the control module collects and stores the formation data as a function of azimuth (aka tool face angle) and radius (aka depth of investigation). Note that the sensor module may be able to repeat its measurements many times at each azimuth and depth of investigation and statistically combine the measurements to improve measurement accuracy.

In block 906, the control module processes the data to select one or more radii of interest. In a first embodiment, the radius of interest is determined to be that of the innermost ring having a peak-to-peak magnitude above a threshold (e.g., threshold 702 in FIG. 7). In a second embodiment, the radii of interest are those of the one or more rings (if any) having changes in peak-to-peak magnitude above a threshold (e.g., threshold 802 in FIG. 8). Alternatively, the radius of the maximum derivative is chosen (point 806 in FIG. 8). In a third embodiment, the radii of interest are those of the rings having the minimum and maximum peak-to-peak variations. In yet another embodiment, the control module processes the data to determine a distance to a bed boundary and the radii of interest are chosen for the rings that bracket this distance.

In block 908, the control module selects a subset of the formation data to send to the surface based on the identified radii of interest. The selected formation data is preferably the data from the rings having the radii of interest, optionally including the adjacent inner and outer rings. When no radius of interest is identified, the control module selects an arbitrary ring or sends an average resistivity value for the whole slice. The process then repeats, starting again with block 902.

Figure 10:
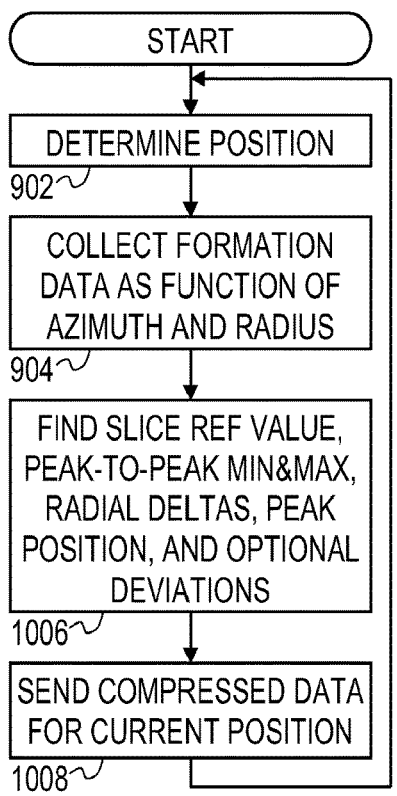
FIG. 10 is a flowchart of a second illustrative telemetry method that sends compressed data.

FIG. 10 is a flowchart of a second illustrative telemetry method that sends compressed data. As in FIG. 9, the control module determines the tool position and collects formation data in blocks 902 and 904. In block 1006, the control module extracts, from each "constant-Z" slice of formation data, various characteristic parameters that provide a condensed representation of the formation data. In some embodiments, these parameters include (optionally for each of attenuation and phase shift) an average for the slice, a maximum (or minimum) sinusoidal peak-to-peak variation, the azimuthal direction of the peak variation, and a sequence of peak-to-peak delta values indicating the change in peak-to-peak variation from one ring to the next. In block 1008, these parameters are sent to the surface and the process repeats from block 902.

If further compression is desired, the parameter values can be each expressed as a change in value with respect to the parameters of the previous slice. Thus, for example, the control module calculates a difference between the average value for this slice and the average for the preceding slice. Once this difference has been communicated to the surface, the processing system adds the difference to the average from the preceding slice to obtain the average for this slice. As another option for further compression, the control module may only send the position and magnitude of the largest one or two peak-to-peak delta values, or only the position and magnitude of those delta values having magnitudes above a threshold.

If additional bandwidth is available, the control module can optionally send deviations from the idealized model represented by the foregoing parameters. For example, given the foregoing parameters, the processing system can predict the measurements for each bin in the cylindrical data volume. The control module can encode and send some or all of the differences between this prediction and the actual measurement values. Thus, the position and values of the largest differences can be encoded and sent to refine the model reconstructed by the processing system at the surface.

Figure 11:
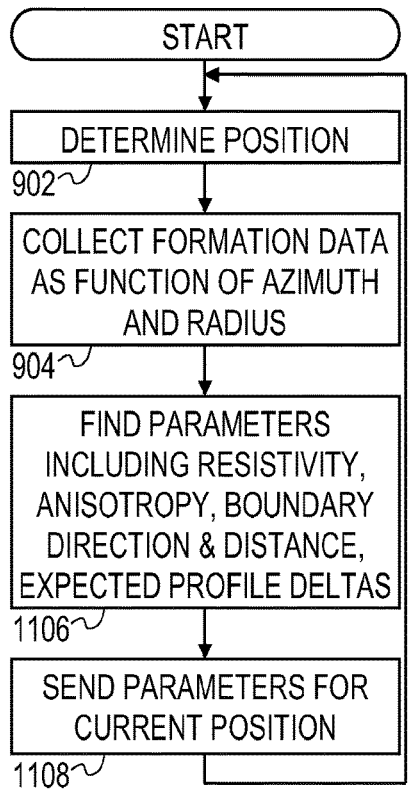
FIG. 11 is a flowchart of a third illustrative telemetry method that sends boundary distance and/or direction information.

FIG. 11 is a flowchart of a third illustrative telemetry method that sends boundary distance and/or direction information. As in FIG. 9, the control module determines the tool position and collects formation data in blocks 902 and 904. In block 1106, the control module processes the formation data to determine the desired information about the information, e.g., resistivity and resistive anisotropy of the current formation bed, as well as the distance and direction to the nearest bed boundary. Methods for determining this information are known and can be readily implemented by a downhole processor. See, e.g., U.S. Pat. No. 6,476,609 entitled "Electromagnetic wave resistivity tool having a tilted antenna for geosteering within a desired payzone" by Michael Bittar, or application PCT/US07/64221 entitled "Robust inversion systems and methods for azimuthally sensitive resistivity logging tools" by Michael Bittar and Guoyu Hu. In some embodiments, multiple boundaries can be identified and tracked to enable distance/direction information to be determined for each boundary.

In block 1108, the control module transmits the desired formation information to the surface and the process repeats beginning in block 902. In some embodiments, the extracted formation information is further processed to generate a predicted tool response that is subtracted from the tool measurements. This subtraction is expected to greatly reduce the dynamic range of the data, enabling the data to be represented with significantly fewer bits. If sufficient bandwidth is available, all of these differences can be transmitted to the processing system at the surface to enable full reconstruction of the measured data. Alternatively only a selected group of differences may be transmitted to enable a more approximate reconstruction of the data. Suitable selection methods include reduced spatial resolution (e.g., sending differences from every-other azimuthal sector and every-other ring), and selecting based on magnitude of the differences (e.g., sending only those differences that exceed some threshold).

The foregoing methods are particularly suitable for use with geosteering tools in which it is desirable to control the drilling direction so as to cause the borehole to parallel a selected boundary or an existing borehole. In some embodiments, the control module processes the formation data downhole to determine the boundary distance and direction information. The control module operates as an autopilot to automatically steer the drilling assembly in response to this boundary information, maintaining the borehole at a programmed distance from the boundary.

The foregoing methods also enable real-time updating of an "earth model", e.g., a representation of the geology in a surrounding region. Such a model is useful in characterizing and exploiting hydrocarbon reservoirs. The representation can take the form of a data volume having rectilinear bins, or 'voxels', containing one or more formation property values such as density, porosity, slowness, resistivity, and so on. Alternatively, the representation can take the form of labeled geological strata that are characterized by approximate position, orientation, and shape, as well as one or more characteristics that enable the strata to be distinguished from one another. Other representations can also be used. Such an earth model can be developed from seismic surveys, exploratory wells, and geological studies of the region. The foregoing methods enable knowledge of the tool position to be combined with measurements of boundary distance and direction for a relatively precise determination of boundaries between strata. The earth model parameters can then be adjusted to enforce agreement with the tool measurements. The precise adjustment method depends on the form of the earth model. For example, if the representation takes the form of labeled strata, the orientation and thickness of the strata can be adjusted to match the tool measurements.

In many developing oilfields, multiple wells are being drilled at any given time. It is expected that real-time updating of an oilfield's earth model would significantly improve the information available to the individual drillers, thereby enabling better drilling decisions (e.g., bit choice, weight-on-bit, well placement, cementation, and well completion). Thus it may be desirable to have the earth model residing at a central facility that collects tool measurements from individual drilling rigs, updates the model, and broadcasts the updated information to the drillers in the field.

In systems where tool measurements exhibit less axial symmetry or it is somehow less desirable to assume that the data has the structure described above, a different compression technique can be employed. For example, every sixteenth slice can be compressed using a two-dimensional discrete cosine transform (2D-DCT) technique similar to JPEG compression, but in the cylindrical coordinate system. The coefficients are scaled, quantized, re-ordered, run-length encoded, and variable-length (e.g., Huffman) coded to significantly reduce the number of bits needed to represent the slice data. The intermediate slices are differentially encoded relative to the preceding slice, leading to even greater reduction in the number of bits needed to represent these slices. This adaptation of the JPEG technique is expected to be particularly effective due to the cylindrical geometry of the measurement data.

Numerous variations and modifications will become apparent to those skilled in the art once the above disclosure is fully appreciated. For example, the bandwidth-saving techniques disclosed herein are also applicable to other azimuthally-sensitive logging tools and to the wireline environment. It is intended that the following claims be interpreted to embrace all such variations and modifications.

What is claimed is:

1. A logging method that comprises:
deploying a logging tool in a borehole, wherein the logging tool has at least one transmitter and at least one receiver;
transmitting, by the at least one transmitter, signals into a formation; receiving, by the at least one receiver, response signals corresponding to the transmitted signals, wherein the response signals relate to different tool positions, tool face angles, and radial distances from the borehole;
processing, by a downhole processor, the response signals to determine a cylindrical data volume of formation property values, wherein the cylindrical data volume include slices of the cylindrical data volume, each of said slices having multiple data rings corresponding to the different radial distances from the borehole axis;
determining, using the downhole processor, a compressed slice representation for each of a plurality of said slices, wherein said determining a compressed slice representation comprises selecting, based on selected radial distances having characteristics indicative of a bed boundary, one or more data rings of interest indicative of a radial distance and azimuth corresponding to the bed boundary, wherein the compressed slice representation enables data to be represented by fewer bits;
transmitting each compressed slice representation from a downhole tool to an uphole processing system, wherein said transmitting involves propagation of an uplink signal through a telemetry channel; processing each compressed slice representation to generate an information for display to a user;
determining a distance and direction with the tool position to determine a bed boundary position; updating an earth model based at least in part on said bed boundary position; and steering a drill string relative to the bed boundary position, wherein the bed boundary position is recorded on the cylindrical data volume of formation property values.

2. The method of claim 1, wherein each data ring includes measurements that vary as a function of azimuth, and wherein each compressed slice representation includes: an average formation property value, a maximum magnitude of sinusoidal variation within a data ring, an azimuth for a peak of the sinusoidal variation, and a series of changes in magnitude of sinusoidal variation between data rings.

3. The method of claim 1, wherein the compressed slice representation is determined using a two dimensional discrete cosine transform applied to formation property values for a selected data ring of interest.

4. The method of claim 1, wherein the compressed slice representation includes an estimated boundary distance and direction.

5. The method of claim 1 wherein said information represents the earth model.

6. The method of claim 1, further comprising updating earth model voxel values based on one or more of the compressed slice representations.

7. The method of claim 6, wherein the updated earth model voxel values correspond to resistivity values.

8. The method of claim 6, wherein the updated earth model voxel values correspond to porosity values.

9. The method of claim 6, wherein the updated earth model voxel values correspond to slowness values.

* * * * *